US006959053B2

(12) United States Patent  (10) Patent No.: US 6,959,053 B2
Gerhards et al.  (45) Date of Patent: Oct. 25, 2005

(54) METHOD AND APPARATUS FOR SEARCHING FOR A PRE-DEFINED CODE IN A BIT STREAM

(75) Inventors: Ronald H. Gerhards, Vancouver (CA); William Burchill, Vancouver (CA); Gus Vos, Vancouver (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 810 days.

(21) Appl. No.: 09/903,645

(22) Filed: Jul. 13, 2001

(65) Prior Publication Data

US 2003/0012312 A1    Jan. 16, 2003

(51) Int. Cl.[7] .............................................. H04L 27/06
(52) U.S. Cl. ..................................... 375/343; 375/150
(58) Field of Search .............................. 375/130, 140, 375/141, 142, 143, 147, 149, 150, 152, 342, 375/343, 362, 365, 367, 368

(56) References Cited

U.S. PATENT DOCUMENTS

| 5,440,597 | A   |   | 8/1995 | Chung et al. ............... 375/200 |
| 5,592,518 | A   | * | 1/1997 | Davis et al. ................ 375/368 |
| 5,781,543 | A   |   | 7/1998 | Ault et al. |
| 5,805,648 | A   |   | 9/1998 | Sutton ........................ 375/367 |
| 6,175,561 | B1  |   | 1/2001 | La Rosa et al. |
| 6,434,185 | B1  | * | 8/2002 | Struhsaker et al. ......... 375/142 |
| 6,775,318 | B2  | * | 8/2004 | Chen et al. ................. 375/149 |

FOREIGN PATENT DOCUMENTS

| EP | 0880238 A   | 11/1998 |
| WO | WO 0239607 A | 5/2002 |

OTHER PUBLICATIONS

Vitterbi, A.J.; Alison Wesley; "CDMA—Principles of Spread Spectrum Communications"; Section 3.4.3, 1995.

Moon, Hichan; Sangburn Kim; "Performance of Double Dwell Acquisition with Continuous Integration Detector in DS-CDMS System"; IEEE Vehicular Technology Conference, v. 3, pp. 2507-2511, May 18-21, 1998.

Park, Hyung-Rae; "Performance Analysis of a Double-Dwell Serial Search Technique for Cellular CDMA Networks in the Case of Multiple Pilot Signals"; IEEE Transactions on Vehicular Technology, v. 48 n. 6, pp. 1819-1830, Nov. 1, 1999.

Long, Biqi; Hichan Moon; "Detection and False Alarm Probability of PN Code Acquisition in DS-CDMA System"; IEE Electronics Letters, v. 33 n 11, pp. 926-928, May 22, 1997.

Lee, William C.Y.; "Mobile Communications Engineering"; McGraw-Hill, Section 1.5, 1982.

* cited by examiner

*Primary Examiner*—Chieh M. Fan
(74) *Attorney, Agent, or Firm*—Aaron Waxler (57) ABSTRACT

A method of searching for a predefined code in a bit stream, the method comprising initiating a first search for correlation of the bit stream with a reference code applied to the bit stream at a first plurality of different times according to a first resolution to produce a first set of correlation values and associated times. Then a second search is initiated for correlation of the bit stream with the reference code applied to the bit stream at a second plurality of different times to produce a second set of correlation values and associated times, the reference code being offset in time from a maximal correlation value of the first set such that the reference code is applied to the bit stream at times other than times of the first plurality. Then, out of the first and the second sets a maximal correlation value is selected for use in calculating a strength of the predefined code in the bit stream.

20 Claims, 4 Drawing Sheets

METHOD AND APPARATUS FOR SEARCHING FOR A PRE-DEFINED CODE IN A BIT STREAM

BACKGROUND OF THE INVENTION

1. Field of Invention

This invention relates generally to the field of multiple access digital communication, and more particularly, to methods, apparatus, media and signals for searching for a predefined code in a bit stream, as well as to systems incorporating same.

2. Description of Related Art

In the field of communications, there is often a need for multiple transmitters to transmit simultaneously on a shared transmission medium. In order to facilitate such shared access to a medium it is necessary to provide a method of avoiding interference between the transmissions of separate users. A number of methods for facilitating multiple access are known in the art, such as time division multiple access (TDMA) and frequency division multiple access (FDMA). Direct sequence spread spectrum (DS-SS) techniques, such as code division multiple access (CDMA) possess significant advantages over TDMA and FDMA however.

A direct sequence coding spread spectrum communication technique essentially encodes a digital data signal with a digital pseudo-random sequence (hereinafter, "pre-defined code") of much higher bit rate to produce a third signal, a process sometimes called "spreading". Individual bits of this pre-defined code are called chips.

This third signal may be modulated to a radio-frequency carrier and transmitted from an antenna. At a receiver, the radio-frequency carrier is demodulated to reproduce the third signal. The receiver generates a digital pseudo-random sequence of the same form as that of the received signal (hereinafter, "reference code"), and attempts to synchronize its phase to that of the received signal in order to recover the data thereof. DS-SS communication systems typically transmit such a code, also called a pilot signal, to allow users to synchronize to the transmitter and receive communications therefrom. However, multi-paths which are received separate instances of the pre-defined code at various amplitudes and phases due to atmospheric and environmental conditions, i.e., "echoes" of the pre-defined code may also be received.

Searching for a pre-defined code in a bit stream representing a received signal by attempting to correlate it with a reference code is often called "acquisition". Generally, acquisition entails searching for the position (e.g., phase) of a pre-defined code in a received bit stream by attempting to correlate it with a plurality of reference codes, each generally of a form similar to the pre-defined code, but at a different position (e.g., phase) than the pre-defined code. In so doing, acquisition effectively tests multiple hypotheses of what the pre-defined code position (e.g., phase) might be in order to find a hypothesis of said position that is maximally likely for the given search parameters.

It will be appreciated that the overall search window may be very large, but the location of the pre-defined code will span a narrow region thereof (the "region of interest"), in which most of the energy from multi-paths of the pre-defined code subsists. For example, the overall search space for the pre-defined code may span thousands of chips, but most of the energy of multipaths of the pre-defined code may be confined within a narrow region of interest, spanning 13 microseconds or 16 chips, for example. Ideally, one would like to concentrate one's search in the region of interest, but without prior knowledge about what may be the region of interest such a search is not feasible.

It is known in the art that the accuracy of a search for the phase of the pre-defined code may be increased by performing a second search with a larger effective search time, known as dwell time. Such an approach is taken by dual dwell systems, which perform two searches. Typically dual-dwell systems attempt to locate a region of interest by a first coarse search at a first resolution, and then, once a sufficient correlation is found, they concentrate their search at the same resolution on the region of interest by increasing the dwell time over a smaller window spanning the region of interest, which yields a better estimate of the presence of a pilot signal in that region (i.e., a longer second dwell provides a reduction in the statistical variance of the energy estimation). The cost of this approach is that the second dwell must take a longer period in order to improve search accuracy. An approach reducing the time of the second dwell is needed.

It will further be appreciated that the received signal is analog and bandwidth-limited in nature. Thus, when the received analog signal is converted into a digital bit stream, the resultant signal will comprise pseudo-digital pulses which are only an approximation of the original digital bit stream in the transmitter before transmission. Various other radio-frequency signals, including multi-paths of the pilot signal itself, interfere with the received signal further. An acquisition method, means, code, apparatus, or system, may therefore find a correlation at a particular position or phase of the reference code, but this location or phase may be sub-optimal since it may be found at the edge of the bit of the pre-defined code in the incoming bit stream.

Unfortunately, a sub-optimal alignment of a receiver's reference code will lead to inaccuracies in despreading data in its received signal. Moreover, in a IS-95 CDMA system, an accurate determination of the phase of a pilot signal improves the timing of handoffs of cell phone communication channels between basestations. As such, there is a need for enhanced accuracy of pulse-targeting to ensure that the position or phase of a reference code may be accurately aligned to that of a pre-defined code in an incoming bit stream.

SUMMARY OF THE INVENTION

The present invention addresses the above need by providing, in accordance with one aspect of the invention, a method of searching for a pre-defined code in a bit stream. The method involves initiating a first search for the position by applying the reference code at multiple times or phases to the received bit stream containing the pre-defined code according to a first resolution to produce a first set of correlation values and associated times. Then, a second similar search, at the same resolution, but smaller window size, is initiated to produce a second set of correlation values and associated times, the starting point for the second search being offset in time from a maximal correlation of the first set of correlation values by a defined interval, and the reference code being applied at times other than those searched in the first search. A maximal correlation value is selected out of the first and second sets of data for use in calculating the strength of the sought pre-defined code in the received bit stream at a maximally likely position or phase.

By following the above method, the accuracy of the overall search is increased since the resolution is increased over a region of interest.

In addition, the time to search or memory requirements ordinarily associated with higher resolution searches are not significantly increased because the results of the first search may be limited to a small number of maximal values. For example, in one embodiment, the method may double the search resolution from ½ chip to ¼ chip over the region of interest, but maintains a search cost that is roughly comparable to that of a ½ chip resolution search. Furthermore, the peak signal strength loss associated with a ½ chip resolution search can be 1.2 dB or higher (depending on the baseband filtering assumed), but a ¼ chip resolution search may cut this loss to less than ¼ db, thereby enhancing search accuracy.

Moreover, performing a second search at a ½ chip resolution at locations offset by ¼ chip from those of the first search and combining the results with those of the first search is more efficient than performing the second search at a ¼ chip resolution, since a search window that is twice as large can be effectively searched in the same amount of time for a given allowable search cost.

In accordance with another aspect of the invention, there is provided a computer readable medium for providing codes for directing a processor circuit to search for a predefined code in a bit stream. The codes direct the processor circuit to initiate a first search for the position of the predefined code by applying the reference code at multiple times or phases to the received bit stream containing the pre-defined code according to a first resolution to produce a first set of correlation values and associated times. Then, the processor circuit is directed to initiate a second search, at the same resolution, to produce a second set of correlation values and associated times, the starting point for the second search being offset in time from a maximal correlation of the first set of correlation values by a defined interval, and the reference code being applied at times other than those searched in the first search. The processor circuit is also directed to select out of the first and second sets of data maximal correlation values for use in calculating the strength or the sought pre-defined code in the received bit stream at maximally likely positions.

In accordance with another aspect of this invention, there is provided a signal encoded with computer readable instructions for directing a processor circuit to search for a pre-defined code in a bit stream. The signal has a first code segment for directing the processor circuit to initiate a first search for correlation of the bit stream with a reference code applied to the bit stream at a plurality of different times according to a first resolution to produces a first set of correlation values and associated times. The signal also has a second code segment for directing the processor circuit to initiate a second search for correlation of the bit stream with said reference code applied to the bit stream at a second plurality of different times to produce a second set of correlation values and associated times, the reference code being offset in time from a maximal correlation value of the first set such that the reference code is applied to the bit stream at times other than times of the first plurality. The code segments cause a maximal correlation value to be chosen from the first and second sets together for use in calculating a strength of the predefined code in the bit stream.

In accordance with another aspect of this invention, there is provided an apparatus comprised of a searcher and a searcher controller. The searcher is operable to search for correlation of a reference code with a bit stream, by applying the reference code to the bit stream at a plurality of different times according to a first resolution to produce a set of correlation values and associated times. The search controller is operable to initiate a first search as described above, to initiate an offset second search as described above, such that the data from the first and second searches is operable to determine a measure of the strength of the predefined code in the bit stream at the associated times.

The controller may be operable to reference the times from the first and second sets to a common time. The controller may be operable to select, out of the first and said second sets, a maximal correlation value for use in calculating the strength of the predefined code in the bit stream.

The controller may cause the second search to be initiated when the maximal correlation value of the first set exceeds a threshold value and the searcher may be programmable to selectively initiate the second search.

The controller may be operable to limit the first and second sets of correlation values to a pre-defined number of correlation values.

The controller may be operable to produce the correlation results within a search window, over a dwell time, at a chip resolution and at a window start time offset relative to a timing signal, the start time offset being a fraction of the chip resolution. The controller may be operable to supply search window, dwell time, resolution, and start time offset variables to the searcher to define parameters of the first and second searches. The controller may also be operable to supply a start time offset variable specifying a start time at a multiple of one-half of the resolution, relative to the maximal correlation value. The start time may be earlier than the time associated with the maximal correlation value of the first set by ⅝ of a bit time of the reference code, for example.

The controller may be operable to eliminate from the first and/or second sets of correlation values, the correlation values which are less than adjacent correlation values and nearer in time than a defined period.

The searcher may be implemented in an application specific integrated circuit (ASIC) and the controller may be implemented a digital signal processor, for example.

Advantageously, the apparatus may perform the entire dual search process within a low-level DSP-based search engine, without burdening the usual maintenance algorithms executed by a higher-level central processor (CPU) of the system in which the apparatus is used. As such, this dual search adds no traffic to the interface between the DSP and CPU. Furthermore, whether the DSP performs a dual search or not may be determined by the CPU as part of its overall search request by simply setting or clearing a flag in its request primitive to the DSP.

In accordance with another aspect of the invention, there is provided an apparatus for searching for a predefined code in a bit stream. The apparatus includes an integrated circuit and a processor circuit. The integrated circuit is configured to search for correlation of a bit stream with a reference code applied to the bit stream at a plurality of different times according to a first resolution to produce a set of correlation values and associated times. The processor circuit communicates with the integrated circuit, and is configured to initiate a first search, a second search, and to produce a combined set of correlation values and associated times to produce a combined set of correlation values operable to be used for determining a measure of the strength of the predefined code in the bit stream.

In accordance with another aspect of the invention, there is provided a system incorporating the above apparatus, and further comprising a base band down converter for demodulating a quadrature encoded input signal to produce I and Q bit streams, the searcher including a correlator for correlating the reference code with the I and Q bit streams. The system may further comprise a receiver for receiving quadrature encoded pilot signals in a direct sequence spread spectrum (DS-SS) system, and be operable to use the combined set of correlation values to calculate the strength of a received pilot signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
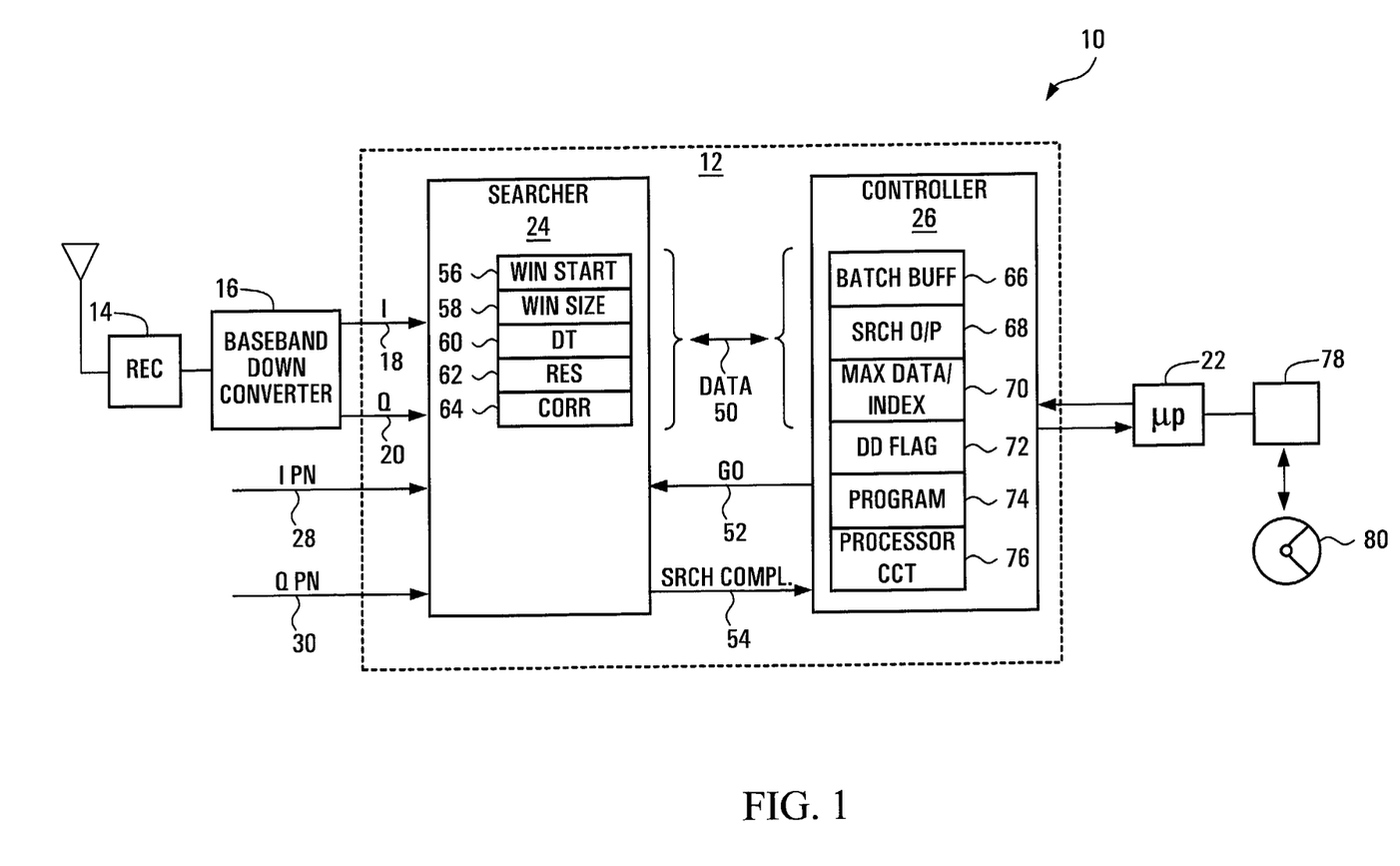
FIG. 1 is a block diagram of a system according to a first embodiment of the invention.

Referring to FIG. 1, a communications appliance for use in a direct sequence spread spectrum (DS-SS) system, according to one aspect of the invention is shown generally at 10. In this embodiment, the system includes a receiver 14 for receiving a quadrature encoded pilot signal and multipaths thereof from a base station in a (DS-SS) system. Typically such a signal is a pseudo random bit sequence and thus may be regarded as a pre-defined code.

The receiver 14 provides a signal to a baseband down converter 16 which produces in-phase (I) and quadrature (Q) component bit streams 18 and 20 of the received pilot signal. An apparatus 12 according to another aspect of the invention searches for the predefined code in the in-phase (I) and quadrature (Q) components and produces a measure of pilot signal strength.

It will be appreciated that in a DS-SS system a base station (not shown), or remote mobile station, will transmit the pseudo-random bit sequence as a pilot signal for use by remote communications appliances to allow them to synchronize with the base station or other transmitting station to decode information transmitted therefrom. It will be appreciated that in general pilot signals may be simultaneously transmitted from a plurality of transceivers and may be subject to distortion due to atmospheric conditions or environmental conditions, giving rise to multipath pilot signals at generally the same form as the original signal but varied in amplitude and phase. This often makes it difficult for an appliance to discern between received pilot signals and to determine which pilot signal the mobile system should synchronize with. The apparatus 12 functions to produce representations of signal strength of the various pilot signals it receives to permit a microprocessor 22 of the wireless communications appliance to determine which pilot signal to synchronize with.

In this embodiment the predefined code is comprised of "chips" which are defined as the time period during which the pilot signal is held constant (i.e., the bit period of the pilot signal). Typically, in a CDMA system these chips have a period of about 0.81 $\mu$Seconds for a chipping rate of 1.2288 Mchips/sec.

Apparatus

To produce a measure of signal strength, the apparatus 12 includes a searcher shown generally at 24 and a controller shown generally at 26. In this embodiment, the searcher 24 is implemented in an application specific integrated circuit (ASIC) which may include other communications functions of the system, besides the searcher 24, for example.

The controller 26, in this embodiment, is implemented by a processor circuit which, in this embodiment, is programmable. The processor circuit may include a digital signal processor, for example, and it may be implemented on the ASIC, for example. A CPU of the system may also be incorporated on the ASIC.

Effectively, the searcher 24 is operable to search for correlation of a reference code with the predefined code represented by the I and Q component bit streams 18 and 20. To do this the searcher 24 applies the reference code to the I and Q component bit streams 18 and 20 at various time offsets from a time base and produces a correlation value for each time offset, representing correlation of the reference code at that time offset. Each time offset is identified by an index and thus the result of each search is a set of correlation values and associated indices. The indices are successively offset in time by a time period referred to herein as the search resolution. Typically the search resolution may be ½ chip, for example. Thus, each time offset is equivalent to ½ of a chip period.

The controller 26 is operable to communicate with the searcher 24 to initiate a first search for correlation of the received signal with the reference code to produce a first set of correlation values and associated indices and is also operable to selectively initiate a second search, for correlation of the received signal with the reference code to produce a second set of correlation values and associated indices. In the second search the time base is offset from the time base of the first search by a fraction of the search resolution to effectively provide correlation values at indices between the indices of the correlation values produced by the first search. This effectively increases the resolution of the search, enabling correlation values to be produced for signal energies skewed in phase. This improves the accuracy of the measurement of the pilot signal strength.

Figure 2:
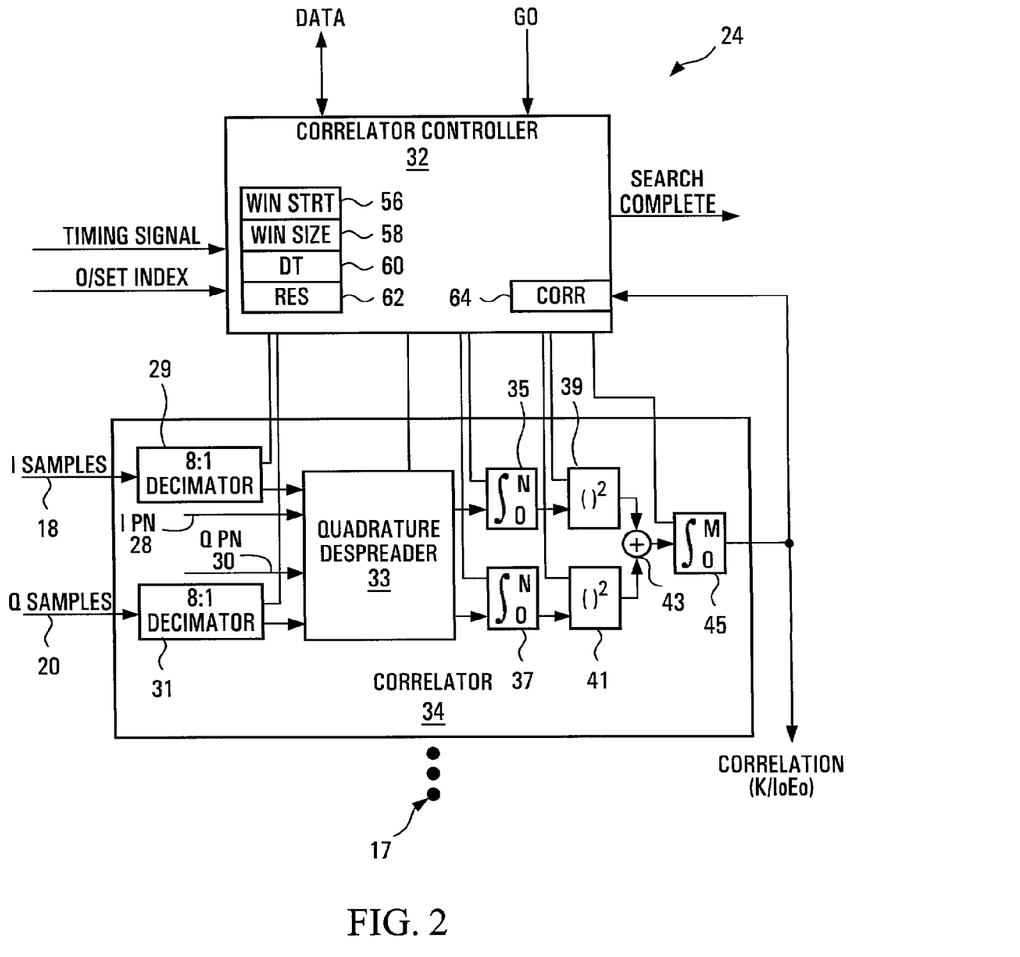
FIG. 2 is a block diagram of a searcher shown in FIG. 1.

Referring to FIG. 2, the searcher 24 is shown in greater detail. The searcher includes a correlator controller 32 and a plurality of parallel correlators, one of which is shown at 34. In this embodiment there are thirty-two correlators. Each correlator is controlled by the same controller 32.

Each correlator receives the same I and Q component bit streams 18 and 20 and further receives I and Q components of a reference bit stream which are labelled as I PN and Q PN 28 and 30, respectively.

Each correlator has a pair of decimators 29 and 31, a quadrature despreader 33, pair of accumulators 35, 37, squarers 39 and 41, a summer 43, and an integrator 45. The I and Q bit streams 18 and 20 are received as samples at respective decimators 29 and 31 at a bit rate of about 8×1.2288 MHz=9.8304 MHz. The decimators reduce the number of samples according to the desired search resolution which, in this embodiment, is ½ chip. Thus, two I and Q samples per chip period are provided to the quadrature despreader 33. The samples provided by the decimators 29 and 31 at each correlator 34, or the I PN and Q PN components of the reference code are, however, delayed by different respective amounts corresponding to the time offset associated with the respective correlator so that each correlator is associated with a different time offset. The remaining functions of each correlator are the same and are conventional, such that each correlator produces a respective correlation value after the accumulators 35, 37 and integrator 45 are allowed to operate on the incoming I and Q components for a given dwell time. The given dwell time may be represented by the product of coherent and non-coherent accumulation periods N and M, for example, as is known in the art. The correlation values and corresponding indices are stored in a correlation buffer 64 on completion of a search.

The correlator controller 32 receives a master timing signal which indicates a phase of the reference code and is operable to delay the start of a search by a programmable amount, relative to the phase of the reference code, to provide the different time bases for each search. In this embodiment this delay has a resolution of ⅛ chip.

The correlator controller 32 controls the despread, accumulation, squaring, summing and integrating functions of the correlator in response to variables stored in a winstart register 56, a winsize register 58, a dwell time register 60 and a resolution register 62. The winstart register 56 holds an offset value representing the time base delay (i.e., phase shift) to be applied to the overall search. The winsize register 58 holds a value representing the number of correlators 34 to be rendered active during the search. The dwell time register 60 holds a value representing the time period, or number of chips, over which the correlation is to be calculated. The resolution register 62 holds a value representing the searcher resolution, i.e., the number of samples per chip which are to be provided from the decimators 29 and 31 of each correlator to their corresponding quadrature despreaders 33.

Referring to FIG. 1, in this embodiment the searcher 24 and controller 26 communicate through a data bus 50 and through control signals including a go signal 52 and a search complete signal 54. The go signal 52 is transmitted from the controller 26 to the searcher 24 and serves to initiate a search. The search complete signal 54 is transmitted from the searcher 24 to the controller 26 and serves to indicate that a search has been completed. The data bus 50 is used to transfer data between registers in the searcher 24 and registers in the controller 26.

The controller 26 includes a batch buffer 66 for holding variables which are to be transmitted from the microprocessor 22 to the controller 26 for use in the winstart 56, winsize 58, dwell time 60 and resolution 62 registers of the searcher 24. In addition, the controller further includes a search output buffer 68 for receiving and accumulating correlation and index values from the correlation buffer 64 of the searcher 24. The controller 26 further includes a max data/index buffer 70 which holds a subset of the accumulation and index values stored in the search output buffer 68, as will be described in more detail below. The controller 26 further includes a dual dwell flag register 72 operable to be loaded by the microprocessor 22 to indicate whether or not the ability to conduct the second search is enabled.

Finally, the controller 26 has program memory 74 for receiving and holding a program for directing a processor circuit 76 of the controller 26 to interact with the searcher 24 and manipulate data within registers in the controller 26.

The program memory 74 is operable to receive a signal encoded with processor readable instructions for directing the processor circuit to initiate the first and second searches described above. The instructions further direct the processor circuit 76 to select out of the first and second sets a maximal correlation value for use in calculating a strength of the predefined code in the bit stream. In this embodiment, the instructions further include instructions for directing the processor circuit 76 to actually calculate signal strength of a pilot signal and to provide this signal strength to the microprocessor 22.

The signal providing the processor readable instructions to the controller 26 may be received from a communications interface (not shown), for example, or may be received from the microprocessor 22, for example, in the event that the microprocessor is in communication with a media reader such as shown at 78 for reading a computer readable medium such as shown at 80 upon which are codes for directing the processor circuit to initiate the first and second searches and to select a maximum correlation value for use in calculating a strength of the predefined code in the bit stream.

Referring back to FIG. 1, effectively the controller 26 initiates a first search for correlation of the received signal bit stream with the reference code applied to the received signal bit stream at a first plurality of different times, i.e., different time offsets to produce a first set of correlation values and associated times, the times being represented by indices.

Then the processor determines from the first set of correlated values, a maximal correlation value and initiates a second search to produce a second set of correlation values and associated times, however, the second search is offset in time from the index associated with the maximal correlation value from the first search and hence from the time base of the first search such that, effectively, the bit stream samples considered in the second search are those which are between samples of the first search. Thus, effectively the offset indices used in the second search are shifted in time relative to the same offset indices of the first search such that the second search is performed during a period between successive indices of the first search. Both searches are performed at the same sample resolution, however, the second search is effectively time shifted to search during periods between the samples of the first search, to create a larger set of data with increased resolution. This provides greater accuracy in detecting signal energies in the received I and Q components.

Figure 3A:
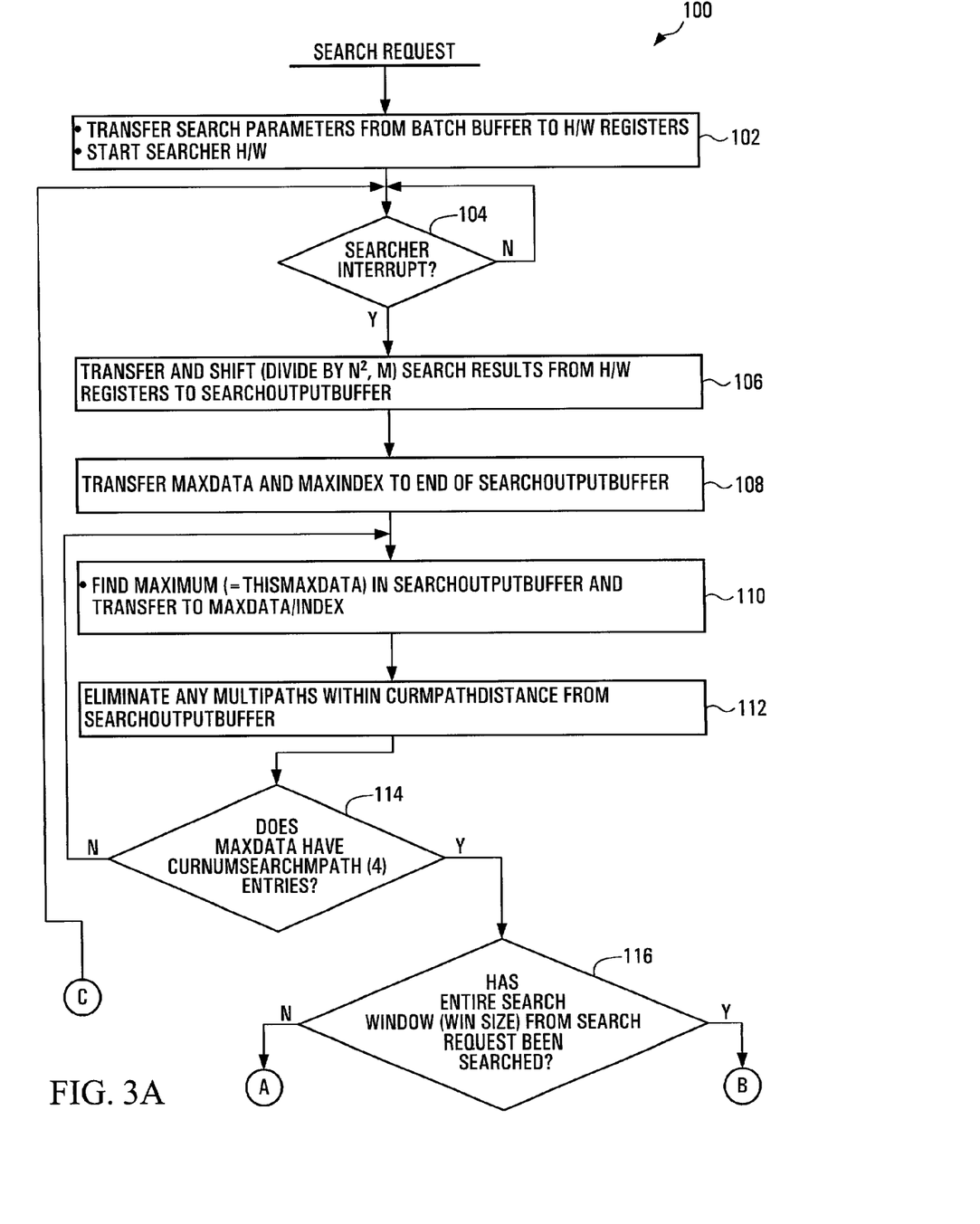
FIGS. 3A and 3B are a flowchart of a pilot routine executed by a processor circuit of the system shown in FIG. 1.
Figure 3B:
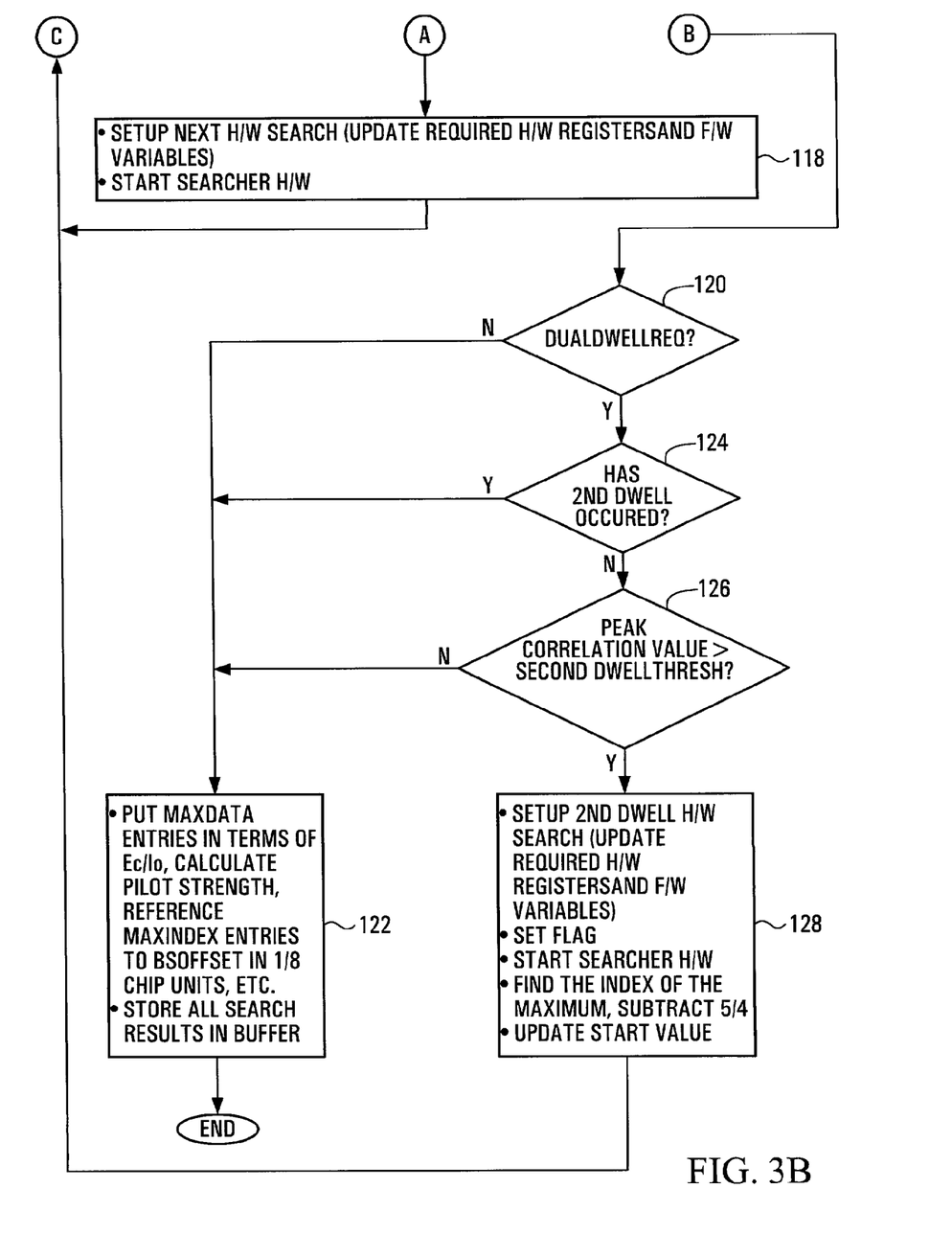

Referring to FIG. 3, a flowchart describing a pilot routine implemented by the codes stored in the program memory 74 shown in FIG. 1 is shown generally at 100. It will be appreciated that the pilot routine is a specific implementation of the method steps described above and thus includes additional enhancements which are not absolutely necessary to achieve the purpose of the invention. A simplified procedure would suffice. Nevertheless, the pilot routine depicts a practical way of implementing the methods described herein.

Referring to FIG. 3, the pilot routine 100 is invoked upon receipt of a search request from the microprocessor 22 shown in FIG. 1.

Upon receipt of a search request, block 102 directs the controller 26 to transfer search parameters from the batch buffer 66 to the hardware registers 56, 58, 60 and 62 and then to render the go signal 52 active, to cause the searcher 24 to initiate a search.

Initially in this example, for the first search the search window is set to 60 chips. Since there are 32 correlators mutually offset by ½ chip, a 16 chip window is effectively searched each time a search is initiated. Thus, 4 search procedures would be required to search the entire 60 chip window.

Block 104 directs the controller 26 to wait for a search interrupt to be received on the search completion signal 54 shown in FIG. 1. When a search interrupt has been received, block 106 directs the controller 26 to normalise and transfer the search results, i.e., the correlation value and its corresponding index value from the correlation buffer 64 in the searcher 24 to the search output buffer 68 of the controller 26. Normalisation is then accomplished by dividing by $N^2$ and M, the inner and outer dwell times, respectively. Block 108 then directs the controller 26 to transfer the maximum correlation value and its associated index in the search output buffer 68 to the end of the search output buffer 68. In other words, a sort is performed by this block.

Block 110 then directs the processor to transfer the maximum correlation value and its corresponding index in the search output buffer 68 to the max data/index buffer 70. Block 112 then directs the controller 26 to eliminate correlation values and associated indices which have index values indicating a time separation between an adjacent correlation and index value less than a minimum threshold, which in this embodiment is 1 chip. Then block 114 directs the controller to determine whether there is a predefined number of entries in the maxdata/index buffer 70 and, in this embodiment, that number is four. If four entries have not been received in the maxdata/index buffer 70, the controller 26 is directed back to block 110 to find the next maximum correlation value in the search output buffer 68 and transfer it to the maxdata/index buffer 70 and then to eliminate correlation values and indices as required by block 112.

Once the predefined number of maximum correlation values (i.e., four), have been loaded into the maxdata/index buffer 70, block 116 directs the processor circuit 76 to determine whether the entire search window (60 chips) has been searched. If not, then block 118 directs the processor circuit 76 to put new search parameters in the batch buffer 66 to transfer these values to the hardware registers 56, 58, 60 and to start the searcher 24 using the go signal 52. Effectively, a loop is formed by blocks 104 and 118 to produce the first set of correlation values and associated times.

After the first set of correlation values has been produced, the processor circuit 76 is permitted to exit block 116 and to proceed to block 120 which causes it to determine whether or not a dual dwell search is requested. This is determined by reading the dual dwell flag register 72 shown in FIG. 1. If a dual dwell search has not been requested, the processor is direct to block 122 which causes it to put the correlation values stored in the maxdata/index buffer 70, in terms of Ec/Io and then to calculate pilot strength therefrom and then to associate the calculated pilot strength to corresponding index values and to pass these results to the microprocessor 22 shown in FIG. 1. The correlation values are put in terms of Ec/Io by scaling out any gain associated with the receive circuitry, normalizing the result over a chip duration, removal of bias, and appropriate Q formatting, as is known in the art. Thus pilot signal strength values are calculated and provided to the microprocessor 22.

Referring back to FIG. 3, if at block 120 a dual dwell request has been made, then block 124 directs the controller 26 to determine whether a second dwell, i.e., a second search has occurred. If so, then the processor is directed to block 122 to perform the functions described therein. If not, the processor is directed to block 126 which causes it to determine whether any of the entries in the maxdata/index buffer 70 is greater than a second dwell threshold value. If not, the processor circuit 76 is directed to block 122 to perform the functions described therein to calculate signal strength values. If the maximum correlation value exceeds the second dwell threshold, the processor is directed to block 128 which causes it to set a second dwell flag in the second dwell flag register 72 for use by the processor circuit at block 124 to determine whether or not the second dwell is in progress, and the processor is directed to load the hardware registers 56, 58, 60 and 62 with suitable values to initiate the second search.

In this embodiment, in initiating the second search, the value loaded into the winstart register 56 is a value representing a time period which is five-quarters of a chip time in advance of the time indicated by the index associated with the maximum correlation value stored in the maxdata/index buffer 70. Thus, the second search is performed over a region starting from an odd number of ¼ chips (⅝ of a chip in this embodiment) earlier in time relative to the time associated with the index for the peak correlation value stored in the maxdata/index buffer 70.

In addition, a search window value of 16 chips is loaded into the winsize register 58 to cause the second search to focus on a region about the maximal correlation value found in the first search.

When the process described by blocks 104 to 124 is repeated to produce and take into account the set of correlation values produced by the second search, it effectively increases the search resolution over the region spanned by the second search.

In addition, while an 'effective' ¼ chip resolution is achieved over the 16 chip search window of the second search, it is achieved by conducting the second search at ½ chip resolution, but offset relative to the 1st search by ⅝ chip. Limiting the second dwell to a 16 chip window at ½ chip resolution results in requiring just a single call to the searcher 24. A typical search window of 60 chips at ½ chip resolution searching requires 4 calls to the hardware, so performing a dual dwell on a window of this size only adds about 25% to the overall correlation time. Performing the second search over 16 chips starting in the vicinity of the maximum correlation value of the first search works well since researchers have shown that typical delay spread profiles fall well within such a window size, and location and lower multi-paths tend to follow the peak multi-path in time.

In addition, the second search only occurs if results from the first search indicate enough energy to warrant it. Many searches of non-active set pilots, such as neighbour set searches, do not reveal pilot signals of significant energy. In those cases, a second search would be wasteful, and is therefore not performed.

While the present embodiment is described in terms of a basestation transmitting a pre-defined code to a mobile transceiver, the generality of the method should not be limited to such an implementation. In another embodiment of this invention, the pre-defined code may be transmitted by, for example, a DS-SS basestation, and the search for the phase of the pre-defined code may be carried out by a mobile transceiver, which applies a reference code of similar form at various phases to search for a correlation. It will be appreciated that in another embodiment of this invention, the pre-defined code may be transmitted instead by, for example, the mobile transceiver, and the search for the pre-defined code may be carried out by a basestation in the manner described above. Alternatively, the communication could take place between two basestations in the above-described manner, or alternatively, two mobile transceivers.

While an embodiment has been described in which two searches are conducted at ½ chip resolution, the second search being offset from the first by ¼ chip and spanning a region of interest defined by a maximal correlation value obtained in the first search, so as to effectively achieve a resolution of ¼ chip over regions of interest, the generality of the method should not be limited to such an approach. In another embodiment, the same approach could be applied to other resolutions, for instance, searching at a 1 chip resolution and re-searching at 1 chip resolution at locations offset by a fraction of 1 chip from those of the first search (i.e., locations not coincident with those of the first set).

While an embodiment has been described in which two searches are conducted, the generality of the method should not be limited to such an approach. In another embodiment of the invention, the same approach could be applied to reference more than two mutually offset sets of searches to a common time base, for instance, doing four sets of searches each at 1 chip resolution each offset from the others by ¼ chip and referencing said four sets to a common time. In the latter scenario, the overall search would have an effective search resolution of ¼ chip although the search cost would be closer to that of a 1 chip resolution search if, for example, the first search was over a wide window and merely identified a region likely to contain a delay spread profile of the pre-defined code, and searches subsequent to the first one were limited to only the region where the delay spread profile is expected.

While the embodiments herein are described for use in a wireless communication system, the generality of the method encompasses any digital communication system requiring provision for the simultaneous access of multiple transmitters to a transmission medium, whether or not the transmission medium is wireless.

While specific embodiments of the invention have been described and illustrated, such embodiments should be considered illustrative of the invention only and not as limiting the invention as construed in accordance with the accompanying claims.

What is claimed is:

1. A method of searching for a predefined code in a bit stream, the method comprising:
   initiating a first search for correlation of said bit stream with a reference code applied to said bit stream at a first plurality of different times according to a first resolution to produce a first set of correlation values and associated times;
   initiating a second search for correlation of said bit stream with said reference code applied to said bit stream at a second plurality of different times, such that said reference cods is applied to said bit stream at times other than times of said first plurality, to produce a second set of correlation values and associated times, said reference code being offset in time from a maximal correlation value of said first set; and selecting out of said first and said second sets a maximal correlation value for use in calculating a strength of said predefined code in said bit stream.

2. A computer readable medium for providing codes for directing a processor circuit to search for a predefined code in a bit stream by:
   initiating a first search for correlation of said bit stream with a reference code applied to said bit stream at a first plurality of different times according to a first resolution to produce a first set of correlation values and associated times;
   initiating a second search for correlation of said bit stream with said reference code applied to said bit stream at a second plurality of different times to produce a second set of correlation values and associated times, said reference code being offset in time from a maximal correlation value of said first set such that said reference code is applied to said bit stream at times other than times of said first plurality; and selecting out of said first and said second sets a maximal correlation value for use in calculating a strength of said predefined code in said bit stream.

3. A signal encoded with computer readable instructions for directing a processor circuit to search for a predefined code in a bit stream, said signal comprising:
   a first code segment for directing said processor circuit to initiate a first search for correlation of said bit stream with a reference code applied to said bit stream at a first plurality of different times according to a first resolution to produce a first set of correlation values and associated times;
   a second code segment for directing said processor circuit to initiate a second search for correlation of said bit stream with said reference code applied to said bit stream at a second plurality of different times to produce a second set of correlation values and associated times, said reference code being offset in time from a maximal correlation value of said first set such that said reference code is applied to said bit stream at times other than times of said first plurality; and selecting out of said first and said second sets a maximal correlation value for use in calculating a strength of said redefined code in said bit stream.

4. An apparatus for searching for a predefined code in a bit stream, the apparatus comprising:
   means for initiating a first search for correlation of said bit stream with a reference code applied to said bit stream at a first plurality of different times according to a first resolution to produce a first set of correlation values and associated times;
   means for initiating a second search for correlation of said bit stream with said reference code applied to said bit stream at a second plurality of different times to produce a second set of correlation values and associated times, said reference code being offset in time from a maximal correlation value of said first set such that said reference code is applied to said bit stream at times other than times of said first plurality; and means for selecting out of said first and said second sets a maximal correlation value for use in calculating a strength of said predefined code in said bit stream.

5. An apparatus for searching for a predefined code in a bit stream, the apparatus comprising:
   a searcher for searching for correlation of said bit stream with a reference code applied to said bit stream at a plurality of different times according to a first resolution to produce a set of correlation values and associated times; and
   a searcher controller operable to initiate a first search for correlation of said bit stream with said referenceode applied to said bit stream at a first plurality of times to produce a first set of correlation values and associated times and operable to initiate a second search for correlation of said bit stream with said reference code applied to said bit stream at a second plurality of different times to produce a second set of correlation values and associated times, said reference code being offset in time from a maximal correlation value of said first set such that said reference code is applied to said bit stream at times other than times of said first plurality, said first and second sets of correlation values being operable to be used for determining a measure of the strength of said predefined code in said bit stream.

6. The apparatus of claim 5 wherein said controller is operable to reference times associated with correlation values in said first set and said second set to a common time.

7. The apparatus of claim 6 wherein said controller is operable to select, out of said first and said second sets, a maximal correlation value for use in calculating said strength of said predefined code in said bit stream.

8. The apparatus of claim 5 wherein said controller causes said second search to be initiated when said maximal correlation value of said first set exceeds a threshold value.

9. The apparatus of claim 8 wherein said searcher is programmable to selectively initiate the second search.

10. The apparatus of claim 5 wherein said controller is operable to limit said first and second sets of correlation values to a pre-defined number of correlation values.

11. The apparatus of claim 5 wherein said searcher is operable to produce a correlation result within a search window, over a dwell time, at a chip resolution and at a window start time offset relative to a timing signal, said start time offset being a fraction of said chip resolution.

12. The apparatus of claim 11 wherein said controller is operable to supply search window, dwell time, resolution, and start time offset variables to said searcher to define parameters of said first and second searches.

13. The apparatus of claim 12 wherein said controller is operable to supply a start time offset variable specifying a start time offset at a multiple of one-half of said chip resolution relative to said maximal correlation value.

14. The apparatus of claim 13 wherein said start time offset is $-5/4$ of a bit time of said reference code.

15. The apparatus of claim 5 wherein said controller is operable to eliminate from said first and/or second sets of correlation values, correlation values which are less than an adjacent correlation values and nearer in time than a defined period.

16. The apparatus of claim 5 wherein said controller comprises a digital signal processor.

17. The apparatus of claim 5 wherein said searcher is implemented in an application specific integrated circuit.

18. An apparatus for searching for a predefined code in a bit stream, the apparatus comprising:

an integrated circuit configured to search for correlation of said bit stream with a reference code applied to said bit stream at a plurality of different times according to a first resolution to produce a set of correlation values and associated times; and a processor circuit in communication with said integrated circuit and configured to control said integrated circuit to initiate a first search for correlation of said bit stream with said referenceode applied to said bit stream at a first plurality of times to produce a first set of correlation values and associated times and operable to initiate a second search for correlation of said bit stream with said reference code applied to said bit stream at a second plurality of different times to produce a second set of correlation values and associated times, said reference code being offset in time from a maximal correlation value of said first set such that said reference code is applied to said bit stream at times other than times of said first plurality, to produce a combined set of correlation values operable to be used for determining a measure of the strength of said predefined code in said bit stream.

19. A system comprising the apparatus of claim 18 and further comprising a baseband down converter for demodulating a quadrature encoded input signal to produce I and Q bit streams, said integrated circuit including a correlator for correlating said reference code with said I and Q bit streams.

20. A system comprising the system of claim 19 and further comprising a receiver for receiving quadrature encoded pilot signals in a direct sequence spread spectrum (DS-SS) system, said processor circuit being operable to use said combined set of correlation values to calculate the strength of a received pilot signal.

* * * * *